United States Patent
Mochizuki

(10) Patent No.: US 9,762,916 B2
(45) Date of Patent: Sep. 12, 2017

(54) ENCODING APPARATUS AND METHOD

(71) Applicant: CANON KABUSHIKI KAISHA, Tokyo (JP)

(72) Inventor: Shigeki Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 346 days.

(21) Appl. No.: 14/470,661

(22) Filed: Aug. 27, 2014

(65) Prior Publication Data
US 2015/0063439 A1    Mar. 5, 2015

(30) Foreign Application Priority Data
Aug. 30, 2013    (JP) ................................ 2013-180354

(51) Int. Cl.
| H04N 19/00 | (2014.01) |
| H04N 19/167 | (2014.01) |
| H04N 19/176 | (2014.01) |
| H04N 19/70 | (2014.01) |
| H04N 19/119 | (2014.01) |
| H04N 19/16 | (2014.01) |

(52) U.S. Cl.
CPC ......... *H04N 19/167* (2014.11); *H04N 19/119* (2014.11); *H04N 19/16* (2014.11); *H04N 19/176* (2014.11); *H04N 19/70* (2014.11)

(58) Field of Classification Search
CPC .. H04N 7/50; H04N 7/26351; H04N 7/26643; H04N 13/026
USPC ..................................................... 375/240.01
See application file for complete search history.

(56) References Cited

U.S. PATENT DOCUMENTS

| 6,940,901 B2 * | 9/2005 | Kato ...................... H04N 19/40 |
| | | 348/E5.002 |
| 8,107,745 B2 * | 1/2012 | Todoroki .............. G06T 3/4007 |
| | | 382/233 |
| 9,584,819 B2 * | 2/2017 | Wang ..................... H04N 19/70 |
| 2003/0197785 A1 * | 10/2003 | White .................. G11B 27/034 |
| | | 348/207.99 |
| 2004/0004614 A1 * | 1/2004 | Bacus ....................... G06T 3/40 |
| | | 345/419 |
| 2005/0163346 A1 * | 7/2005 | van den Bergen ............... G06K 9/00771 |
| | | 382/103 |
| 2006/0090082 A1 * | 4/2006 | Apostolopoulos ...... G06F 21/10 |
| | | 713/189 |

(Continued)

FOREIGN PATENT DOCUMENTS

| JP | 2004228717 A * | 8/2004 | ............. H04N 19/63 |
| JP | 2010-212811 A | 9/2010 | |

(Continued)

OTHER PUBLICATIONS

Machine Translation: JP 2004228717 A.*

(Continued)

*Primary Examiner* — Frank Huang
(74) *Attorney, Agent, or Firm* — Cowan, Liebowitz & Latman, P.C.

(57) ABSTRACT

An encoding apparatus includes an encoder configured to classify an image into a regions corresponding to display screen sizes, and encode the image. The encoder classifies the regions into tile region. The encoder adds, to encoded data, information for associating information of a tile region to be decoded when decoding an image corresponding to one of display screen sizes.

5 Claims, 8 Drawing Sheets

(56) References Cited

U.S. PATENT DOCUMENTS

| | | | |
|---|---|---|---|
| 2008/0084504 A1* | 4/2008 | Nakamura | H04N 5/275 348/590 |
| 2010/0066762 A1* | 3/2010 | Yeh | G06T 11/00 345/629 |
| 2014/0079126 A1* | 3/2014 | Ye | H04N 19/105 375/240.16 |
| 2014/0108963 A1* | 4/2014 | Black | G06F 3/04845 715/753 |

FOREIGN PATENT DOCUMENTS

| | | |
|---|---|---|
| WO | 2013/063094 A1 | 5/2013 |
| WO | 2015/012226 A1 | 1/2015 |

OTHER PUBLICATIONS

The documents cited herein were cited in the May 29, 2017 Japanese Office Action, which is enclosed without an English Translation, that issued in Japanese Patent Application No. 2013180354.

Sally Hattori et al., HLS: Extensions to Motion-constrained tile sets SEI message, Joint Collaborative Team on Video Coding (JCT-VC) of ITU-T SG 16 WP 3 and ISO/IEC JTC 1/SC 29/WG 11, 14th Meeting: Vienna, Austria, AT, Jul. 2013, JCTVC-N0117, pp. 1-4.

Ye-Kui Wang et al., Tile groups, Joint Collaborative Team on Video Coding (JCT-VC) of ITU-T SG16 WP3 and ISO/IEC JTC1/SC29/WG11, 7th Meeting:Geneva, CH, Nov. 2011, JCTVC-G318, pp. 1-9.

\* cited by examiner

FIG. 3A

| T0 | T1 | T2 | T3 | T4 |
|----|----|----|----|----|
| T5 | T6 | T7 | T8 | T9 |
| T10 | T11 | T12 | T13 | T14 |
| T15 | T16 | T17 | T18 | T19 |
| T20 | T21 | T22 | T23 | T24 |

FIG. 3B

| T0 | T1 | T2 | T3 | T4 |
|----|----|----|----|----|
| T5 | T6 | T7 | T8 | T9 |
| T10 | T11 | T12 | T13 | T14 |
| T15 | T16 | T17 | T18 | T19 |
| T20 | T21 | T22 | T23 | T24 |

FIG. 3C

| T0 | T1 | T2 | T3 | T4 |
|----|----|----|----|----|
| T5 | T6 | T7 | T8 | T9 |
| T10 | T11 | T12 | T13 | T14 |
| T15 | T16 | T17 | T18 | T19 |
| T20 | T21 | T22 | T23 | T24 |

FIG. 4A

| T0 | T1 | T2 | T3 | T4 |
|----|----|----|----|----|
| T5 | T6 | T7 | T8 | T9 |
| T10 | T11 | T12 | T13 | T14 |
| T15 | T16 | T17 | T18 | T19 |
| T20 | T21 | T22 | T23 | T24 |

FIG. 4B

| T0 | T1 | T2 | T3 | T4 |
|----|----|----|----|----|
| T5 | T6 | T7 | T8 | T9 |
| T10 | T11 | T12 | T13 | T14 |
| T15 | T16 | T17 | T18 | T19 |
| T20 | T21 | T22 | T23 | T24 |

FIG. 4C

| T0 | T1 | T2 | T3 | T4 |
|----|----|----|----|----|
| T5 | T6 | T7 | T8 | T9 |
| T10 | T11 | T12 | T13 | T14 |
| T15 | T16 | T17 | T18 | T19 |
| T20 | T21 | T22 | T23 | T24 |

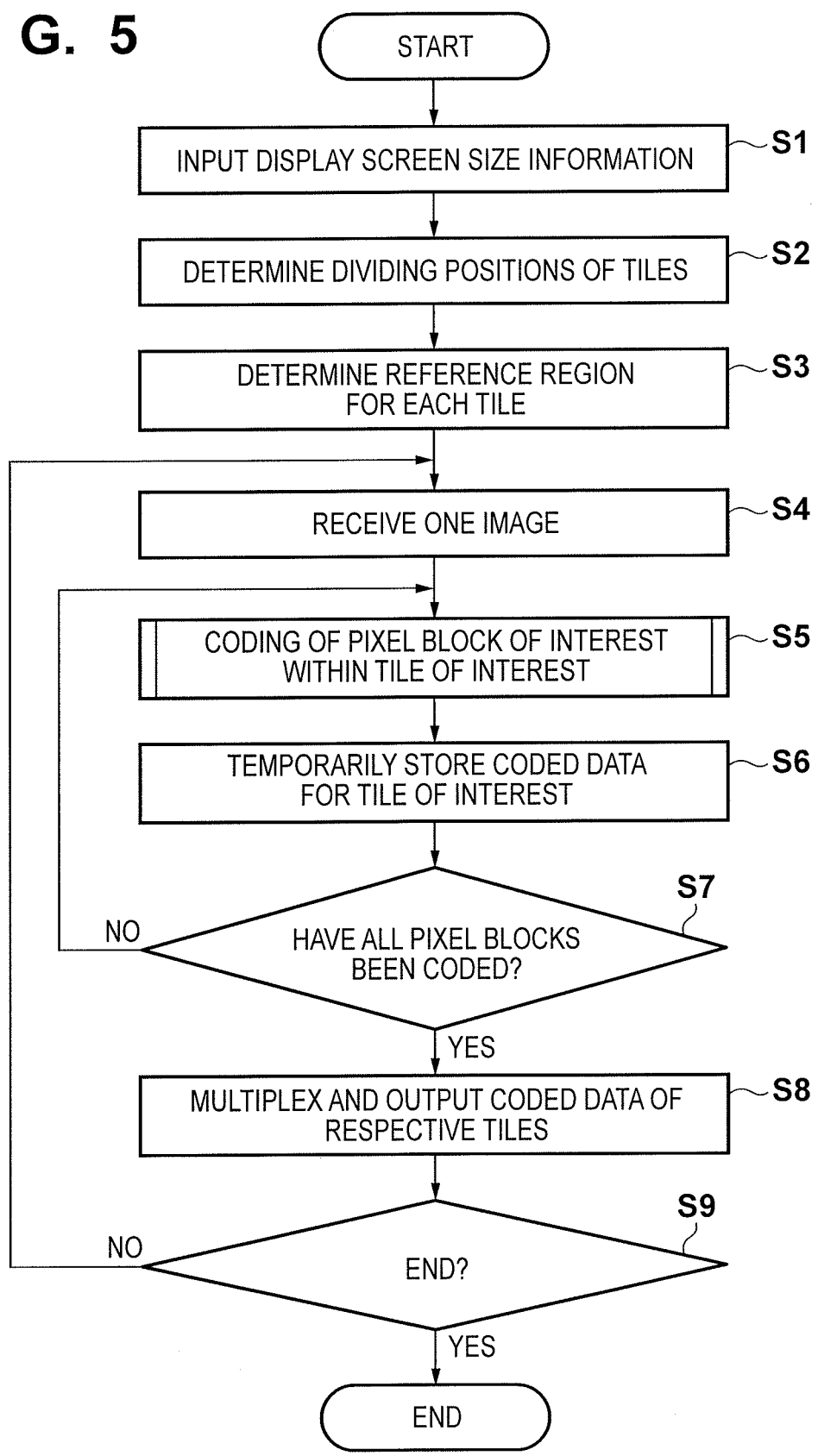

F I G. 7A

| user_data_unregistered (payloadSize) { | |
|---|---|
| uuid iso iec 11578 | u (128) |
| for (i=16; i<payloadSize; i++) | |
| user_data_payload_byte | b (8) |
| } | |

※ u (128) : unsigned interger 128 bits
※ b (8)   : byte

F I G. 7B

| pic_config ( ) { | |
|---|---|
| config_num | u (16) |
| for (i=0; i<config_num; i++) { | |
| aspect_ratio [i] | u (16) |
| pic_width [i] | u (16) |
| pic_height [i] | u (16) |
| tile_num [i] | u (16) |
| for (j=0; j<tile_num [i]; j++) { | |
| tile [i] [j] | u (16) |
| } | |
| } | |

※ u (16) : unsigned interger 16 bits

ENCODING APPARATUS AND METHOD

BACKGROUND

Field of the Invention

The present invention relates to an image data coding technique.

Description of the Related Art

There are conventionally known an image capture apparatus, a mobile communication apparatus, and the like as image processing apparatuses for performing compression coding of moving image data. The image capture apparatus or the mobile communication apparatus acquires a moving image signal based on an image shot by an image capture unit, performs compression coding of the acquired moving image signal, and records the thus obtained signal in a recording medium.

In recent years, devices which can reproduce the recorded contents of various aspect rations has been introduced.

Along with diversification of reproduction environments, in Japanese Patent Laid-Open No. 2010-212811, a method of implementing coding of moving images of a plurality of resolutions is proposed. Japanese Patent Laid-Open No. 2010-212811 discloses a technique of coding, for a moving image, two moving images, that is, one moving image having a low resolution and obtained by extracting a region of interest from the moving image, and the other moving image having the resolution of the moving image from which no region of interest is extracted. In Japanese Patent Laid-Open No. 2010-212811, moving image data of two different resolutions are coded while suppressing a code amount by replacing pixel values corresponding to the region of interest having the resolution of the moving image by a single color.

However, for moving image data coded by the above-described technique, when reproducing a moving image of a high resolution, it is necessary to decode two encoded data, and combine the data into one reproduction image. This may complicate decoding process.

SUMMARY

According to an aspect of the present invention, there is provided a new technique of generating encoded data. For example, there is provided a technique of generating encoded data for simplifying decoding process.

According to an aspect of the present invention, there is provided an encoding apparatus comprising: an input unit configured to input an image; and an encoder configured to classify an image into regions corresponding to display screen sizes, and encode the image, wherein the encoder classifies the regions into tile regions, and the encoder adds, to encoded data, information for associating information of a tile region to be decoded when decoding an image corresponding to one of the display screen sizes.

Further features and aspects of the present invention will become apparent from the following description of exemplary embodiments with reference to the attached drawings.

BRIEF DESCRIPTION OF THE DRAWINGS

FIGS. 3A to 3C are views each showing a relationship between a determined display screen size and tiles included in a display screen;

FIGS. 4A to 4C are views each showing an example of tile dividing according to a second exemplary embodiment;

FIG. 5 is a flowchart illustrating a processing procedure of an image coding apparatus according to the first exemplary embodiment;

FIGS. 7A and 7B are views showing a syntax of "user data unregistered SEI" according to the third exemplary embodiment.

DESCRIPTION OF THE EXEMPLARY EMBODIMENTS

Exemplary embodiments, features, and aspects of the present invention will be described below with reference to the drawings. The present invention, however, is not limited to the following exemplary embodiments.

Note that each functional block described in the following exemplary embodiments need not always be an individual hardware component. That is, for example, the functions of some functional blocks may be executed by one hardware component. Alternatively, several hardware components may cooperate with each other to execute the function or functions of one or a plurality of functional blocks. The function of each functional block may be executed by a program loaded into a memory by a CPU (Central Processing Unit).

First Exemplary Embodiment

In the first exemplary embodiment, an arrangement and a processing procedure of an image coding apparatus will be described. The first exemplary embodiment may be applicable to any apparatus which includes a moving image data compression coding unit. For example, the first exemplary embodiment may be applied to an image capture apparatus represented by a video camera or digital camera, a mobile communication apparatus, or a computer.

Figure 1:
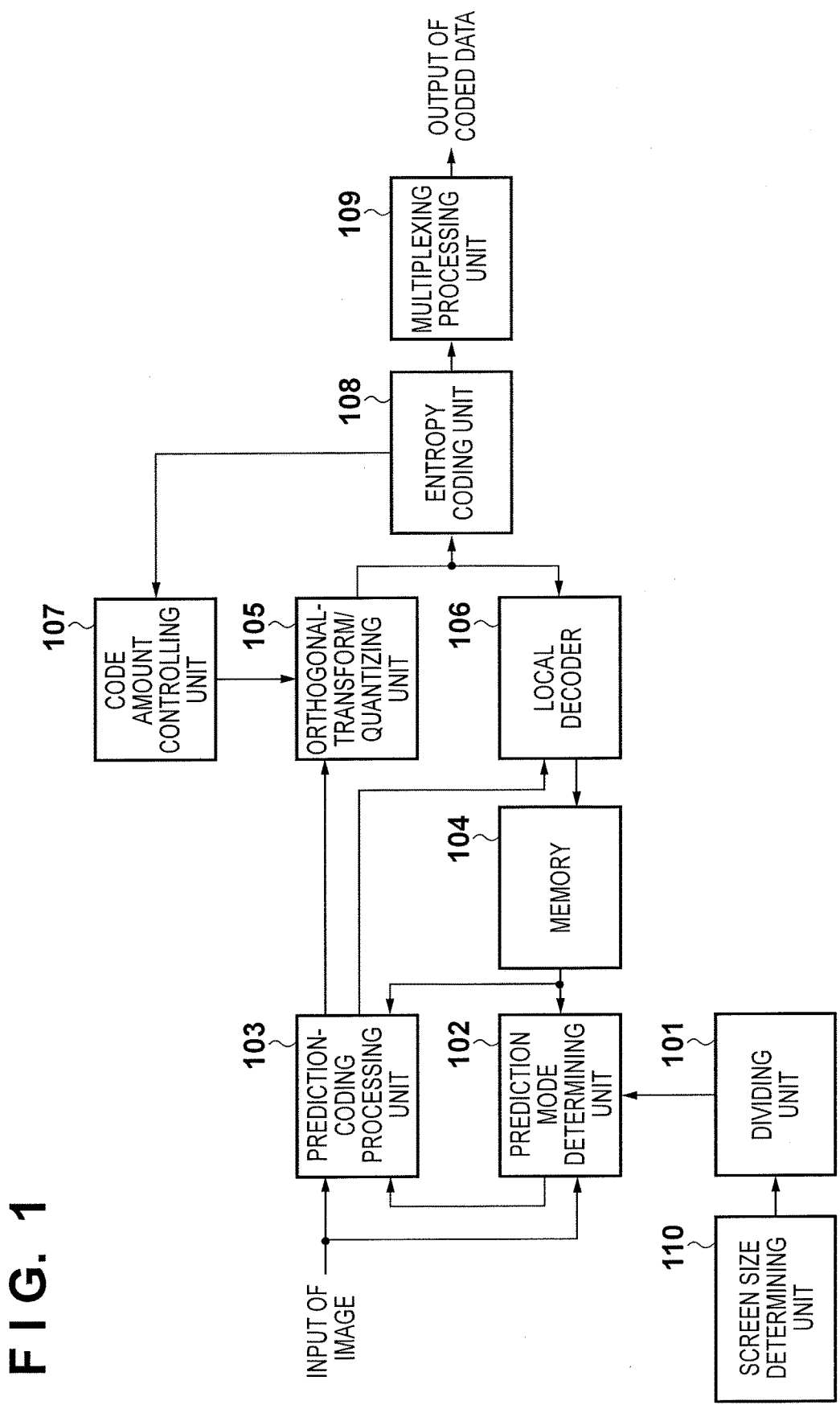
FIG. 1 is a block diagram showing an arrangement of an image coding apparatus according to a first exemplary embodiment.

The arrangement and the processing procedure of an image coding apparatus for performing coding by an H.265 (ITU H.265 or ISO/IEC23008-2) method according to the first exemplary embodiment, will be described with reference to a block diagram shown in FIG. 1.

To conform to a size of a display screen on the decoding side, a dividing unit 101 first acquires, from a screen size determining unit 110, one or more display screen size information about one or more display screen sizes each smaller than an image size of a coding target input image. The screen size determining unit 110 is typically a storage unit (a nonvolatile memory or the like) for storing information determined by an operation unit, and supplies the one or more display screen size information indicating one or more display screen sizes to the dividing unit 101. As long as no change is made, therefore, the dividing unit 101 acquires the same display screen size information every time. Note that although the input source of the display screen size information is the nonvolatile memory in this example, the first exemplary embodiment is not limited to this, and any type of memory may be used. Furthermore, the display screen size is defined by the numbers of pixels in the horizontal and vertical directions. Note that the first exemplary embodiment is not limited to this, and it is possible to specify the display screen size based on the number of pixels on one side and an aspect ratio.

The dividing unit 101 analyzes one or more display screen size information acquired from the screen size determining unit 110. The dividing unit 101 determines dividing positions where a coding target image is divided, based on coordinates indicating the boundary of each display screen size when the center position of a rectangle defined by the display screen size is made to coincide with the center position of a coding target image. The dividing unit 101 assigns numbers (to be referred to as tile numbers hereinafter) to respective regions (to be simply referred to as tiles hereinafter) obtained by dividing the coding target image into tiles at the determined coordinate positions, and associates each tile number with each tile position in the coding target image. The dividing unit 101 generates display screen dividing information from the one or more display screen size information acquired from the screen size determining unit 110, and provides the generated display screen dividing information to a prediction mode determining unit 102. The dividing unit 101 outputs information representing a prediction-coding condition for each tile to the prediction mode determining unit 102 during a coding process. The information representing the prediction-coding condition includes information for defining a range within which the prediction pixel block of a pixel block of interest (coding target block) within a given tile is acquired when encoding the pixel block of interest (to be described in detail later).

The prediction mode determining unit 102 determines a prediction method for each pixel block within the coding target image based on the display screen dividing information and the information representing the prediction-coding condition, which have been received from the dividing unit 101. The prediction mode determining unit 102 calculates an evaluation value indicating the coding efficiency by performing a simple intra-prediction process or an inter-prediction process including motion detection based on the input image signal and pixel values, which has been coded, read out from a memory 104 storing a decoded image which has been coded, and determines a prediction method which optimizes the coding efficiency. If the coding target pixel block is an I-slice, the prediction mode determining unit 102 determines an intra-prediction pixel block size and prediction mode. If the coding target pixel block is a P- or B-slice, the prediction mode determining unit 102 selects one of intra-prediction and inter-prediction, whose coding efficiency is higher. In the case of inter-prediction, the prediction mode determining unit 102 determines intra-prediction coding parameters such as an intra-prediction pixel block size and intra-prediction mode. In the case of inter-prediction, the prediction mode determining unit 102 determines inter-prediction coding parameters such as a reference image frame, pixel block dividing pattern, and motion vector. The prediction mode determining unit 102 outputs the determined prediction coding parameters to a prediction-coding processing unit 103.

When encoding the pixel block of interest within the tile of interest in the coding target image, the prediction-coding processing unit 103 generates a prediction pixel block from the image read out from the memory 104 in accordance with the prediction coding parameters acquired from the prediction mode determining unit 102. The prediction-coding processing unit 103 outputs a prediction residual block as the difference between the pixel block of interest and the prediction pixel block to an orthogonal-transform/quantizing unit 105. The prediction-coding processing unit 103 also outputs the prediction pixel block to a local decoder 106.

The orthogonal-transform/quantizing unit 105 performs an orthogonal-transform process for the prediction residual block provided by the prediction-coding processing unit 103. The orthogonal-transform/quantizing unit 105 also quantizes each coefficient, obtained by performing the orthogonal-transform process, by using a quantization step according to quantization parameters determined by a code amount controlling unit 107 (to be described later). The orthogonal-transform/quantizing unit 105 supplies the quantized coefficient (quantized data) to an entropy coding unit 108 and the local decoder 106. The local decoder 106 performs an inverse quantization process and an inverse orthogonal-transform process for the quantized data to generate prediction residual data. The local decoder 106 adds a prediction image input from the prediction-coding processing unit 103 to the prediction residual data, performs a decoding process, and stores image data indicated by the thus obtained pixel block in the memory 104. The decoded image data stored in the memory 104 is used for subsequent intra-prediction process. Note that the local decoder 106 may perform a deblocking filter process, and store the decoded image data in the memory 104. In this case, the decoded data having undergone the deblocking filter process, which is held in the memory 104, is to be used for subsequent inter-prediction process.

The entropy coding unit 108 performs an entropy coding process by CABAC (Context-Adaptive Binary Arithmetic Coding) for each slice of the received quantized data. The entropy coding unit 108 includes a binarization unit for converting the input quantized data (multi-value data) into binary data, and a binary data memory for storing binary data generated by the binarization unit. The entropy coding unit 108 also includes a context calculating unit for calculating the occurrence probability of binary data according to the context, and holding it, and an arithmetic coding unit for performing arithmetic coding according to the occurrence probability supplied by the context calculating unit. The entropy coding unit 108 supplies the encoded data to a multiplexing processing unit 109 for each tile, and also outputs a generated code amount to the code amount controlling unit 107.

The code amount controlling unit 107 serves as a processing unit for controlling the code amount of the encoded data so as to prevent overflow or underflow of a coded picture buffer. The code amount controlling unit 107 generates a quantization parameter for an image to be subsequently input, based on the generated code amount supplied from the entropy coding unit 108 after entropy coding, and supplies the quantization parameter to the orthogonal-transform/quantizing unit 105.

A display screen dividing method of the dividing unit 101 according to the first exemplary embodiment will be described. A coding target image according to the first exemplary embodiment has a size of 4,160 pixels in the horizontal direction and 2,352 pixels in the vertical direction. For the sake of simplicity, assume that a CU (Coding Unit) in H.265 is 16×16 pixels. Dividing positions where the coding target image is divided into tiles are indicated by integer multiples of 16 in both the vertical and horizontal directions.

For the sake of simplicity, in the first exemplary embodiment, the one or more display screen size information acquired by the dividing unit 101 from the screen size determining unit 110 includes at least as follows:

display screen 1: 3,840×2,160 pixels (aspect ratio=16:9)
display screen 2: 2,880×2,160 pixels (aspect ratio=4:3)
display screen 3: 3,840×1,584 pixels (aspect ratio=12:5)

As described above, the dividing unit 101 makes the center position of each display screen size coincide with that of a coding target image. To do this, the dividing unit 101 first calculates the coordinates of the upper left and lower right corners of a rectangle defining each display screen size. Assume that the horizontal direction size (the number of pixels) of the coding target image is WH (=4,160), and its vertical direction size (the number of pixels) is WV (=2,352). The horizontal size and vertical size of a smaller display screen are represented by SH and SV, respectively. The upper left corner position of the coding target image is determined as an origin. The upper left coordinates and lower right coordinates of the rectangle indicated by each display screen are respectively calculated by:

$$\text{upper left coordinates: } (X0,Y0)=((WH-SH)/2,(WV-SV)/2) \quad (1)$$

$$\text{lower right coordinates: } (X1,Y1)=(X0+SH,Y0+SV) \quad (2)$$

According to equations (1) and (2), the coordinates of the upper left and lower right corners of the rectangle represented by the display screen 1 are given by:
upper left coordinates: (X0, Y0)=(160, 96)
lower right coordinates: (X1, Y1)=(4000, 2256)

The coordinates of the upper left and lower right corners of the display screen 2 are given by:
upper left coordinates: (X0, Y0)=(640, 96)
lower right coordinates: (X1, Y1)=(3250, 2256)

The coordinates of the upper left and lower right corners of the display screen 3 are given by:
upper left coordinates: (X0, Y0)=(160, 384)
lower right coordinates: (X1, Y1)=(4000, 1968)

Figure 2:
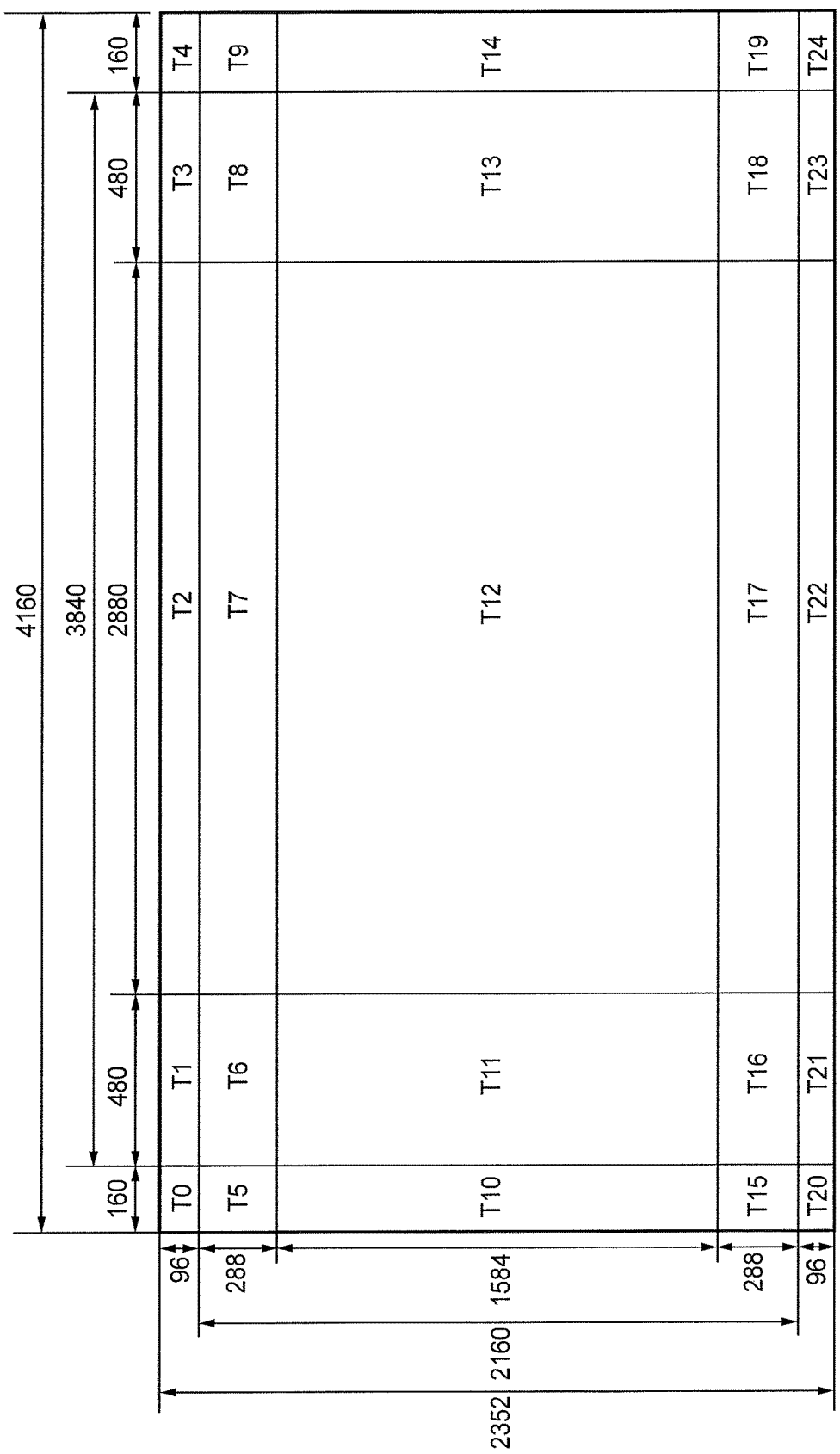
FIG. 2 is a view for explaining a display screen dividing process by a dividing unit.

FIG. 2 shows the relationships between the coding target image and the display screens 1 to 3, as a result of the above calculation process.

FIG. 2 shows a state in which the coding target image is divided by horizontal and vertical lines respectively passing through the respective coordinate positions obtained by the above calculation process. Rectangular regions T0 to T24 in FIG. 2 indicate tiles, and each tile is coded as a slice according to H.265.

As shown in FIG. 3A, the display screen 1 is represented by the nine tiles T6 to T8, T11 to T13, and T15 to T18 in total. As shown in FIG. 3B, the display screen 2 is represented by the three tiles T7, T12, and T17 in total. As shown in FIG. 3C, the display screen 3 is represented by the three tiles T11 to T13 in total.

The dividing unit 101 according to the first exemplary embodiment determines an image reference range serving as a prediction-coding condition for each divided tile so as to allow decoding of tiles forming each of the display screens 1, 2, and 3 by referring to the tiles. That is, to allow decoding by referring to the tiles forming the size of each display screen, the dividing unit 101 determines an image reference range (prediction block search range) serving as a prediction-coding condition for each tile.

(i) For the tiles T0 to T4, T5, T9, T10, T14, T15, T19, and T20 to T24 used for the entire coding target image, the entire display screen can be referred to. For example, since the entire display screen can be referred to for the tile T0, a set of tiles allowed to be referred to when encoding the tile T0 is represented by R(T0). In this case, R(T0){T0, T1, T2, . . . , T24} (all the tiles) is determined.

(ii) For the tiles T6, T8, T16, and T18 used for the entire display screen and the display screen 1, all the tiles forming the display screen 1 can be referred to. Similarly to the above example, by using R( ), R(T6)=R(T8)=R(T16)=R(T18)={T6, T7, T8, T11, T12, T13, T16, T17, T18} is determined.

(iii) For the tiles T7 and T17 used for the entire display screen and the display screens 1 and 2, all the tiles forming the display screen 2 can be referred to. R(T7)=R(17)={T7, T12, T17} is determined.

(iv) For the tiles T11 and T13 used for the entire display screen and the display screens 1 and 3, all the tiles forming the display screen 3 can be referred to. R(T11)=R(13)={T11, T12, T13} is determined.

(v) Finally, for the tile T12, the tile T12 itself can be referred to. That is, R(T12)={T12} is determined.

In the above example, the number of determined display screens is three. However, the number of determined display screens is defined as M, the total number of tiles is defined as N, and respective tiles are defined as $T_0$ to $T_{N-1}$. The following generalized representation is provided.

A set A0 of tiles forming the coding target image includes all the tiles, and thus A0={$T_1$, $T_2$, . . . , $T_{N-1}$}. Similarly, sets A1 to AM of tiles, which respectively form display screens 1 to M, can be defined. It is necessary to determine, as tiles to be referred to when encoding a tile Ti (i is one of 0 to N-1), tiles common to sets, of the sets A0 to AM, which include the tile Ti as an element.

For example, assume that the first exemplary embodiment is applied (the number of determined display screens is three). Focusing attention on the tile T1, the set A0 includes the tile T1 as an element, and thus all the elements (all the tiles) of the set A0 are to be referred to. Furthermore, focusing attention on the tile T7, the sets A0, A1, and A2 include the tile T7 as an element with reference to FIGS. 3A and 3B (the set A3 is excluded). Elements common to the sets A0, A1, and A2 are {T7, T12, T17}. Focusing attention on the tile T11, the sets A0, A1, and A3 (the set A2 is excluded) include the tile T11 as an element. In this case, elements common to these sets are {T11, T12, T13}. Focusing attention on the tile T12, all the sets A0 to A3 include the tile T12, and the element T12 is common to all the sets.

As described above, the dividing unit 101 determines, for each tile, a referable range when encoding the tile. The dividing unit 101 supplies the display screen dividing information including information for defining the positions and sizes of the respective tiles T0 to T25 to the prediction mode determining unit 102. The dividing unit 101 also supplies, to the prediction mode determining unit 102, information (prediction-coding condition information) for defining, for each tile, a referable range when encoding the tile.

When, for example, coding a pixel block of interest within the tile T11, since the referable range R(T11)={T11, T12, T13} is designated, the prediction-coding processing unit 103 searches an image region defined by these tiles for a prediction pixel block. The prediction-coding processing unit 103 supplies residual block data as the difference between the found prediction pixel block and the pixel block of interest to the orthogonal-transform/quantizing unit 105. The above process is performed irrespective of intra-coding or inter-coding. For example, when performing inter-coding of the pixel block of interest within the tile T11, temporally different images are referred to, and a reference range corresponds to a region represented by the tiles T11, T12, and T13 in the image to be referred to.

Figure 8:
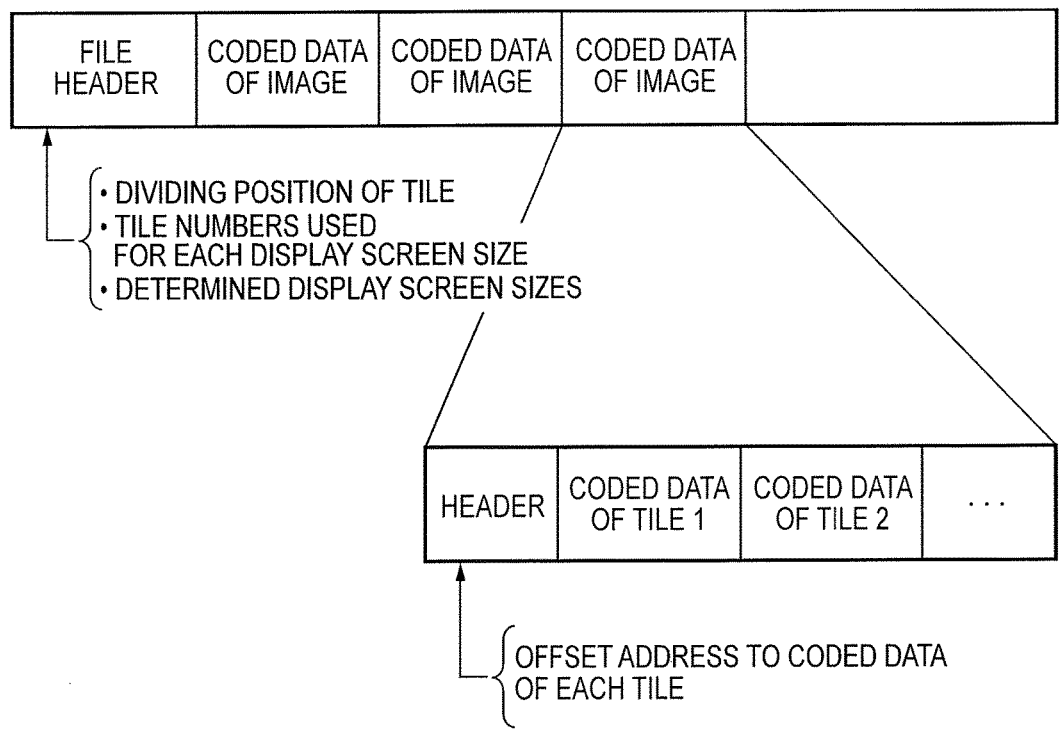
FIG. 8 is a view showing an example of a structure of a moving image data file generated by an image coding apparatus according to the first exemplary embodiment.

FIG. 8 shows an example of the data structure of a coded image file generated by the multiplexing processing unit 109 of the image coding apparatus according to the first exemplary embodiment.

At the start of coding of an image, the multiplexing processing unit 109 stores, in a file header, information indicating the dividing position of each tile, determined display screen sizes, tile numbers, and tile numbers used in each determined display screen (for example, the tiles T7, T12, and T17 are used in the display screen 2), in addition to information such as the size of a coding target image. Note that if, in both coding and decoding apparatuses, the tile numbers are assigned in the order of raster scan performed for each tile, the need for the tile numbers may be eliminated. When generating encoded data for each image, the multiplexing processing unit 109 stores information for specifying the start position of the encoded data of each tile in a image header. The start position is typically a bit position from the beginning of the encoded data of one image. The code amount of each tile may be used. That is, if the encoded data are arranged in the order of the tile numbers, the offset address of the encoded data of the tile T3 can be a bit position indicated by the sum of the code amounts of the tiles T1 and T2.

In summary, the image coding apparatus shown in FIG. 2 can perform a process according to a flowchart shown in FIG. 5.

In step S1, the dividing unit 101 receives (acquires) one or more display screen size information from the screen size determining unit 110. In step S2, the dividing unit 101 analyzes the received one or more display screen size information, and determines the coordinates of the dividing positions of a coding target image. In step S3, the dividing unit 101 sequentially assigns tile numbers to respective divided regions by referring to the one or more display screen size information, and determines, for each tile, a tile region which is allowed to be referred to when encoding the tile. In the above example, a region defined by the tiles T11, T12, and T13 is allowed to be referred to when encoding the tile T11.

When the tile region to be referred to is determined for each tile as described above, the image coding apparatus receives image data of one image in step S4. In step S5, a processing unit represented by the prediction mode determining unit 102, prediction-coding processing unit 103, and orthogonal-transform/quantizing unit 105 codes a pixel block of interest. The prediction-coding processing unit 103 determines which tile is the tile of interest, and searches for the pixel block of interest from the reference range defined by the tile region determined for the tile. Whether a image to be searched for a prediction block is the current image or another image depends on a coding mode at this time. Upon completion of coding of the pixel block of interest, the process advances to step S6, and the encoded data is temporarily stored in a buffer for each tile, which has been allocated in advance to the memory of the multiplexing processing unit 109. In step S7, it is determined whether all the pixel blocks of the image of interest have been coded. As long as it is determined that not all the pixel blocks of the current image have been coded, the processes in steps S5 and S6 are repeated.

Upon completion of coding for one image as described above, the process advances to step S8, and the multiplexing processing unit 109 combines, in a predetermined order, the encoded data of the respective tiles stored in the internal buffers, and adds a tile header to the beginning of the combined data, thereby outputting the resultant data. At this time, the multiplexing processing unit 109 stores an offset address indicating the start position of each encoded data in the tile header so as to individually access the encoded data of the respective tiles.

After that, the process advances to step S9, and it is determined whether there is a image to be coded. If there is a image to be coded, the processes in step S4 and subsequent steps are repeated; otherwise, the coding process ends.

As a result of the first exemplary embodiment, for the input image, it is possible to generate encoded data of QFHD (Quad Full High Definition=3,840×2,160 pixels) for the display screen 1, encoded data of a display screen size having an aspect ratio of 4:3 with respect to QFHD for the display screen 2, encoded data of a display screen size having an aspect ratio of 12:5 with respect to QFHD for the display screen 3.

If a decoding apparatus for reproducing the encoded data (encoded stream) has a function of displaying the image of the display screen 2 (2,880×2,160 pixels), it can perform a decoding process for the encoded data of the tiles T7, T12, and T17 among the encoded data of the image, thereby making it possible to minimize the load of performing the decoding process.

Note that the encoded data generated according to the first exemplary embodiment can be decoded by a decoding apparatus complying with H.265. However, even if the decoding apparatus can display the image of the display screen 2 (2,880×2,160 pixels), it may decode all the tiles of the received encoded data. To solve this problem, information indicating that the image coding apparatus described in the first exemplary embodiment has performed coding, that is, information indicating that it is necessary to decode the encoded data of tiles corresponding to a display screen (information indicating that a tile which can be excluded from the decoding process may exist) may be stored in the file header. If this information exists in the file header, and one of the display screen sizes defined in the file header coincides with the actual display screen size, it is ensured that a region to be referred to in the decoding process always falls within the range of tiles defined in the display screen, thereby preventing unnecessary decoding process from being performed. Note that the determined display screen size may be used as the information.

Second Exemplary Embodiment

A region to be referred to when encoding one tile (a region where a prediction pixel block is derived) may be determined as follows.

When a tile of interest is a coding target tile, the range of a rectangular region including, at diagonal positions, the tile of interest and a tile which are point-symmetric with respect to the center position of a image to be coded is regarded as a reference region.

For example, focusing attention on a tile T0, a tile T24 is point-symmetric to the tile T0, as shown in FIG. 4A. Therefore, a rectangular region including the tiles T0 and T24 at diagonal positions, that is, the entire region is determined as a region to be referred to when encoding the tile 0. Focusing attention on a tile T6, a tile T18 is point-symmetric to the tile T6, as shown in FIG. 4B. Therefore, the range of tiles T6 to T8, T11 to T13, and T16 to T18 is determined as a reference region when encoding the tile T6. Furthermore, focusing attention on the tile T11, the tile T13 is point-symmetric to the tile T11, as shown in FIG. 4C. Therefore, the range of the tiles T11 to T13 is determined as a reference region when encoding the tile T11.

Third Exemplary Embodiment

Figure 6:
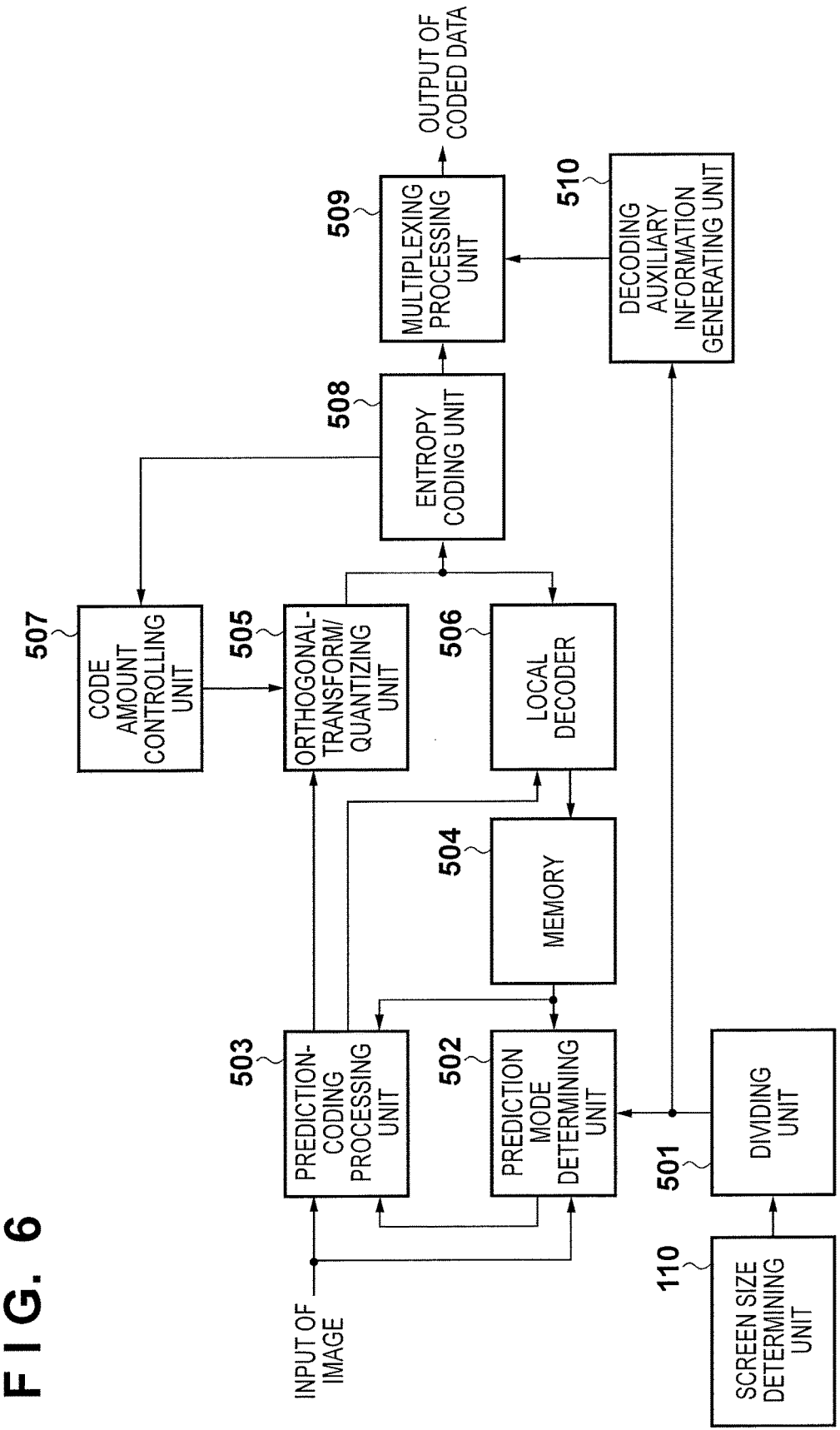
FIG. 6 is a block diagram showing an arrangement of an image coding apparatus according to a third exemplary embodiment.

An arrangement and a processing procedure of an image coding apparatus for performing coding by the H.265 method according to the third exemplary embodiment, will be described with reference to a block diagram shown in FIG. 6. Components 501 to 509 shown in FIG. 6 are the same as the components 101 to 109 of the image coding apparatus described in the first exemplary embodiment and a description thereof will be omitted. A decoding auxiliary information generating unit 510 unique to FIG. 6 will be explained below.

In H.265, a network abstraction layer (NAL) is defined between an image coding layer (VCL) which handles image coding processing and an actual transmission/storage system. The NAL is packetized for each NAL unit made up of an NAL header and RBSP (Row Byte Sequence Payload). The NAL header can be used to identify the type of NAL unit, and the subsequent RBSP stores actual encoded data. The type of NAL unit mainly includes encoded image data (slice), SPS (Sequence Parameter Set) as information about encoded image data sequence, PPS (Picture Parameter Set) as information about a picture of image coded data, and SEI (Supplemental Enhancement Information) as additional information of encoded image data. For SEI, "user data SEI" capable of using a user-defined syntax is prepared, and "user data unregistered SEI" can be used to generate user-defined decoding auxiliary information.

FIG. 7A shows the syntax of "user data unregistered SEI". Of syntax elements, the "user_data_payload_byte" area can store user-defined information. By making it possible to identify, as a UUID, the storage of user-defined information in "user data unregistered SEI" by the "uuid_iso_iec_11578", it becomes possible to use the user-defined information.

The decoding auxiliary information generating unit 510 generates, as SEI, configuration information about each display screen size corresponding to the encoded data based on the one or more display screen size information and the display screen dividing information received from a dividing unit 501. The configuration information about each display screen size to be stored in the "user_data_payload_byte" area will be referred to as "pic_config" hereinafter, and the SEI of the configuration information will be referred to as "pic_config SEI" hereinafter. FIG. 7B shows the definition of the syntax of the configuration information.

The number of configurations of display screen sizes corresponding to an encoded stream is indicated by "config_num". The aspect ratio of each display screen size is indicated by "aspect_ratio" which stores the horizontal value in upper 8 bits, and the vertical value in lower 8 bits. If, for example, the aspect ratio is 16:9, it is represented by 0x1009 in hexadecimal. The numbers of horizontal and vertical pixels of each display screen are respectively indicated by "pic_width" and "pic_height". The number of tiles forming each display screen is indicated by "tile_num". Tile numbers forming each display screen are indicated by "tile".

In the example described in the first exemplary embodiment, there are four configuration information including information about the entire display screen, and thus "config_num" stores "4", and each configuration information is stored as follows. For the entire display screen:
  aspect_ratio[0]=0x1009 (16:9)
  pic_width[0]=4,160
  pic_height[0]=2,352
  tile_num[0]=25
  tile[0][25]={0, 1, 2, 3, 4, 5, 6, 7, 8, 9, 10, 11, 12, 13, 14, 15, 16, 17, 18, 19, 20, 21, 22, 23, 24}
For the display screen 1:
  aspect_ratio[1]=0x1009 (16:9)
  pic_width[1]=3,840
  pic_height[1]=2,160
  tile_num[1]=9
  tile[1][9]={6, 7, 8, 11, 12, 13, 16, 17, 18}
For the display screen 2:
  aspect_ratio[2]=0x0403 (4:3)
  pic_width[2]=2,880
  pic_height[2]=2,160
  tile_num[2]=3
  tile[2][3]={7, 12, 17}
For the display screen 3:
  aspect_ratio[3]=0x0c05 (12:5)
  pic_width[3]=3,840
  pic_height[3]=1,584
  tile_num[3]=3
  tile[3][3]={11, 12, 13}

As described above, by multiplexing "pic_config SEI" on the encoded data as decoding auxiliary information, it is possible to acquire in advance a display screen size, aspect ratio, and tile information corresponding to the encoded data, thereby facilitating reproduction and conversion of the desired display screen size.

Other Exemplary Embodiments

Above-described exemplary embodiments can also be realized by a computer of a system or apparatus that reads out and executes a program stored on a storage medium (e.g., non-transitory computer-readable storage medium) to perform the functions of one or more of the above-described embodiments, and by a method performed by the computer of the system or apparatus by, for example, reading out and executing the program from the storage medium to perform the functions of one or more of the above-described embodiments. The computer may comprise one or more of a central processing unit (CPU), micro processing unit (MPU), or other circuitry, and may include a network of separate computers or separate computer processors. The program may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims the benefit of Japanese Patent Application No. 2013-180354, filed Aug. 30, 2013, which is hereby incorporated by reference herein in its entirety.

What is claimed is:

1. An encoding apparatus comprising:
  a configuration unit configured to make a center of each of displace screen sizes correspond to a center position of an image;
  a dividing unit configured to divide the image into tiles according to each of the display screen sizes;
  a determining unit configured to determine, for each of the tiles, a reference region to be searched for a prediction pixel block when performing encoding;
  an encoder configured to, when encoding a predetermined coding target block, search for a prediction pixel block from the reference region determined and corresponding to a predetermined tile including the predetermined coding target block, and performs prediction coding for the coding target block based on a difference between the predetermined coding target block and the found prediction pixel block; and a processing unit configured to process encoded data so as to independently perform decoding for each of the tiles, wherein the dividing unit determines a coordinate position indicated by each side of each display screen size as a position where the image is divided.

2. The encoding apparatus according to claim 1, wherein when N represents the total number of tiles divided by the dividing unit, and $T_0$ to $T_{N-1}$ represent the respective tiles, $A0 = \{T_1, T_2, \ldots, T_{N-1}\}$ represents a set of the tiles forming the image, and A1 to AM respectively represent sets of tiles included in the respective display screen sizes where M represents the number of display screen sizes determined by the configuration unit, the determining unit determines, as a reference region to be referred to when encoding a tile Ti (i is one of 0 to N-1), a region formed by tiles common to sets, of the sets A0 to AM which include the tile Ti as element.

3. The encoding apparatus according to claim 1, wherein the determining unit determines, as a reference region to be referred to when encoding a tile of interest, a rectangular region including, at diagonal positions, the tile of interest and a tile which is point-symmetric to the tile of interest.

4. A method comprising:

determining display screen sizes smaller than an image;

making a center of each of display screen sizes correspond to a center position of the image;

dividing the image into tiles according to each of the display screen sizes;

determining, for each of the tiles, a reference region to be searched for a prediction pixel block when performing encoding based on the display screen size;

searching for a prediction pixel block from the reference region determined with respect to a pixel block of interest within a tile of interest, and performing prediction coding for the pixel block of interest; and combining encoded data to be accessible for each tile so as to independently perform decoding for each tile, wherein in the dividing step, a coordinate position indicated by each side of each display screen size is determined as a position where the image is divided.

5. A non-transitory storage medium that stores a program for causing a computer to execute a method comprising:

determining display screen sizes smaller than an image;

making a center of each of display screen sizes correspond to a center position of the image;

dividing the image into tiles according to each of the display screen sizes;

determining, for each of the tiles, a reference region to be searched for a prediction pixel block when performing encoding based on the display screen size;

searching for a prediction pixel block from the reference region determined with respect to a pixel block of interest within a tile of interest, and performing prediction coding for the pixel block of interest; and combining encoded data to be accessible for each tile so as to independently perform decoding for each tile, wherein in the dividing step, a coordinate position indicated by each side of each display screen size is determined as a position where the image is divided.

* * * * *